United States Patent Office 3,318,764
Patented May 9, 1967

3,318,764
METHOD FOR CONTROLLING NEMATODES WITH PHOSPHOROUS COMPOUNDS
Iwao Otsubo, Chuo-ku, Tokyo, Yasukazu Ura and Shiro Sato, Kita-ku, Tokyo, and Mitsuru Hayakawa and Kozo Sakata, Minami-Saitama-gun, Saitama-ken, Japan, assignors to Nissan Kagaku Kogyo Company Limited, Tokyo, Japan, a corporation of Japan
No Drawing. Filed June 24, 1963, Ser. No. 290,182
Claims priority, application Japan, June 30, 1962, 37/26,907
3 Claims. (Cl. 167—30)

The present invention relates to a novel soil insecticidal and nematodicidal composition containing an organic phosphorus compound as an effective ingredient.

We have found that an organic phosphorus compound represented by the general formula:

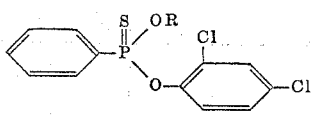

wherein the R is methyl or ethyl group is effective as a soil insecticide and is poisonless to a human being and live stocks. The experimental examples of the present insecticidal composition are explained as follows:

EXPERIMENTAL EXAMPLE 1

Respective components of the present insecticide were dissolved in acetone to form a solution. The resulting solution was applied topically to an adult (♀) house fly, Musca domestica Linne, by means of a micro syringe. 24 hours after the treatment at 25° C., the percentage of dead flies was measured.

| Compounds | Amount of preparation, γ/fly | Number of flies | Percentage of dead flies (percent) |
|---|---|---|---|
| $CH_3O-\overset{S}{\underset{\phantom{|}}{P}}-O-C_6H_3Cl_2$ (phenyl) | 1.5<br>0.5 | 40<br>40 | 95<br>58 |
| $C_2H_5O-\overset{S}{\underset{\phantom{|}}{P}}-O-C_6H_3Cl_2$ (phenyl) | 5.0<br>0.1 | 40<br>40 | 100<br>70 |

EXPERIMENTAL EXAMPLE 2

Respective compounds of the insecticidal composition were added with xylene and Solpol NE (an emulsifying agent) to form an emulsion. The emulsion was diluted with water. Larvae of Pryeria sinica Moore having the weight of 60–70 mg. was instantly dipped in the diluted solution. Then, worms were placed in a petri-dish together with leaves of a spindle tree for 72 hours. Thereafter, the percentage of dead worms was measured. The temperature was 25° C.

| Compounds | Concentration (percent) | Numbers of worms | Percentage of dead worms (percent) |
|---|---|---|---|
| $CH_3O-\overset{S}{\underset{\phantom{|}}{P}}-O-C_6H_3Cl_2$ (phenyl) | 0.1<br>0.05 | 40<br>40 | 100<br>85 |
| $C_2H_5O-\overset{S}{\underset{\phantom{|}}{P}}-O-C_6H_3Cl_2$ (phenyl) | 0.5<br>0.1 | 40<br>40 | 100<br>80 |

EXPERIMENTAL EXAMPLE 3

An emulsion was formed by the same treatment as in Experimental Example 2. The emulsion was diluted with water. 5 cc. of the resulting solution was jetted into a settling tower and Azuki-bean weevil, Callosobruchus chinensis Linne placed in a petri-dish on a turning table was exposed in spray of the preparation for 3 minutes. Thereafter, weevils were removed to a clean pertidish. 24 hours later, percentage of dead weevils was measured. The temperature was 25° C.

| Compounds | Concentration (percent) | Numbers of weevils | Percentage of dead weevils |
|---|---|---|---|
| $CH_3O-\overset{S}{\underset{C_6H_5}{P}}-O-C_6H_3Cl_2$ | 0.1<br>0.05 | 148<br>135 | 100<br>41.8 |
| $C_2H_5O-\overset{S}{\underset{C_6H_5}{P}}-O-C_6H_3Cl_2$ | 0.5<br>0.2 | 138<br>156 | 100<br>36.1 |

EXPERIMENTAL EXAMPLE 4

An emulsion was prepared by the same treatment as in Experimental Example 2. The emulsion was diluted with water. The resulting solution was given to he-mice orally. The result was shown as follows:

| Compounds | $LD_{50}$ (mg./kg.) |
|---|---|
| $CH_3O-\overset{S}{\underset{C_6H_5}{P}}-O-C_6H_3Cl_2$ | 75 |
| $C_2H_5O-\overset{S}{\underset{C_6H_5}{P}}-O-C_6H_3Cl_2$ | 180 |

EXPERIMENTAL EXAMPLE 5

Respective components of the insecticidal composition were diluted with clay and talc to make a powdery preparation containing the effective ingredient of 3%. The preparation was dusted over the soil surface along the rows immediately before onions were transplanted. Thereafter, damage by onion maggots, Hylemyia antiqua Meigen was examined.

Transplanting of onions, May 18.
Measuring of damage, July 8.

The result was shown as follows:

| Compounds | Amount of preparation, kg./10a (3% powder) | Percentage of damage by onion maggots (percent) |
|---|---|---|
| $CH_3O-\overset{S}{\underset{C_6H_5}{P}}-O-C_6H_3Cl_2$ | 6 kg.<br>9 kg. | 28.4<br>26.9 |
| $C_2H_5O-\overset{S}{\underset{C_6H_5}{P}}-O-C_6H_3Cl_2$ | 6 kg.<br>9 kg. | 18.4<br>11.5 |
| Heptachlor (25% powder) | 9 kg. | 58.9 |
| Un-treated | | 71.7 |

EXPERIMENTAL EXAMPLE 6

Respective components of the insecticidal composition were uniformly adsorbed on Vermiculite to prepare granular preparations containing the effective ingredient of 20%. 0.5 g., based on 40 g. of soil, of the preparation was mixed in soil polluted with rootknot nematodes, Meloidagyne incognita Chitwood, and put in a flower-pot. 5 days later, young plants of tomatoes were transplanted in the flower-pot. After one month, tomatoes were pulled up and number of rootknots was counted. The result was shown in the following table.

| Compounds | Amount of the effective ingredient per 400 g. or soil | Number of root knots/ piece |
|---|---|---|
| CH₃O, S, Cl, Cl (P-O-phenyl) | 0.1 g | 0.4 |
| C₂H₅O, S, Cl, Cl (P-O-phenyl) | 0.1 g | 11.0 |
| Un-treated | | 61.0 |

A few examples of compositions of an insecticidal composition containing the compound of the present invention as an effective ingredient are shown in the following.

*Example 1.*—3 parts by weight of O-ethyl-O-2,4-dichlorophenyl-thionobenzenephosphonate is uniformly adsorbed on 97 parts by weight of a powdery mineral carrier such as clay, talc, or diatom earth (300 meshes 98% pass) and mixed, whereby a powdery preparation for dusting use is made.

*Example 2.*—1 part by weight of O-Methyl-O-2,4-dichlorophenyl-ethylbenzene phosphonate is uniformly adsorbed and coated on the surface of 99 parts by weight of a complex fertilizer (e.g. effective N-P-K contents= 15%–15%–10%). Thus formed fertilizer is used agriculturally for soil.

*Example 3.*—30 parts by weight of O-methyl-O-2,4-dichlorophenylthionobenzene phosphonate is added with 50 parts by weight of xylene and 20 parts by weight of Solpol NE, an emulsifying agent, and homogeneously mixed and dissolved, to form an emulsion for spraying use.

What we claim is:

1. A method of controlling nematodes which comprises contacting the nematodes with a toxic amount of an organic phosphorous compound of the formula

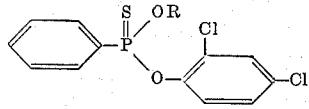

wherein R is alkyl selected from the group consisting of methyl and ethyl.

2. A method of controlling onion maggots which comprises contacting the maggots with a toxic amount of an organic phosphorous compound of the formula

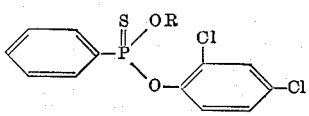

wherein R is alkyl selected from the group consisting of methyl and ethyl.

3. A method of controlling rootknot nematodes which comprises contacting the rootknot nematodes with a toxic amount of an organic phosphorous compound of the formula

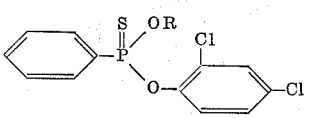

wherein R is alkyl selected from the group consisting of methyl and ethyl.

References Cited by the Examiner
UNITED STATES PATENTS
3,099,597    7/1963    Chupp et al. _____ 167—30

ALBERT T. MEYERS, *Primary Examiner.*

JULIAN S. LEVITT, *Examiner.*

GEORGE A. MENTIS, *Assistant Examiner.*